(12) United States Patent
Pate et al.

(10) Patent No.: US 11,617,015 B2
(45) Date of Patent: Mar. 28, 2023

(54) CONNECTED INTERACTIVE CONTENT DATA CREATION, ORGANIZATION, DISTRIBUTION AND ANALYSIS

(71) Applicant: GRABIT INTERACTIVE MEDIA, INC., Austin, TX (US)

(72) Inventors: Martin Taylor Pate, Austin, TX (US); Marika Roque, Austin, TX (US); Andrew Welch, Los Angeles, CA (US)

(73) Assignee: GRABIT INTERACTIVE MEDIA, INC., Austin, TX (US)

( * ) Notice: Subject to any disclaimer, the term of this patent is extended or adjusted under 35 U.S.C. 154(b) by 0 days.

(21) Appl. No.: 17/575,367

(22) Filed: Jan. 13, 2022

(65) Prior Publication Data

US 2022/0141534 A1    May 5, 2022

Related U.S. Application Data

(62) Division of application No. 16/713,682, filed on Dec. 13, 2019, now Pat. No. 11,272,256.

(Continued)

(51) Int. Cl.
*H04N 21/4725* (2011.01)
*H04N 21/478* (2011.01)
(Continued)

(52) U.S. Cl.
CPC ....... *H04N 21/4725* (2013.01); *G06K 9/6256* (2013.01); *G06V 10/443* (2022.01);
(Continued)

(58) Field of Classification Search
CPC ........... H04N 21/4725; H04N 21/4394; H04N 21/47815; H04N 21/8583; H04N 21/42203; H04N 21/4666; H04N 21/44008; G06K 9/6256; G06V 10/443; G06V 20/46; G06V 2201/10; G06V 10/25; G06V 10/764;
(Continued)

(56) References Cited

U.S. PATENT DOCUMENTS 9,516,251 B2    12/2016  Welch
10,387,729 B2 *  8/2019  Chui .................. G06T 19/00
(Continued)

*Primary Examiner* — Nathan J Flynn
*Assistant Examiner* — Christine A Kurien
(74) *Attorney, Agent, or Firm* — Womble Bond Dickinson (US) LLP

(57) ABSTRACT

A method for identifying a product which appears in a video stream. The method includes playing the video stream on a video playback device, identifying key scenes in the video stream containing product images, selecting product images identified by predetermined categories of trained neural-network object identifiers stored in training datasets. Object identifiers of identified product images are stored in a database. Edge detection and masking is then performed based on at least one of shape, color and perspective of the object identifiers. A polygon annotation of the object identifiers is created using the edge detection and masking. The polygon annotation is annotated to provide correct object identifier content, accuracy of polygon shape, title, description and URL of the object identifier for each identified product image corresponding to the stored object identifiers. Also disclosed is a method for an end user to select and interact with an identified product.

7 Claims, 11 Drawing Sheets

Related U.S. Application Data

(60) Provisional application No. 62/780,080, filed on Dec. 14, 2018, provisional application No. 62/780,031, filed on Dec. 14, 2018.

(51) Int. Cl.

| | |
|---|---|
| *H04N 21/858* | (2011.01) |
| *H04N 21/439* | (2011.01) |
| *G11B 27/34* | (2006.01) |
| *G06K 9/62* | (2022.01) |
| *G06V 10/44* | (2022.01) |
| *G06V 20/40* | (2022.01) |

(52) U.S. Cl.
CPC .............. *G06V 20/46* (2022.01); *G11B 27/34* (2013.01); *H04N 21/4394* (2013.01); *H04N 21/47815* (2013.01); *H04N 21/8583* (2013.01); *G06V 2201/10* (2022.01)

(58) Field of Classification Search
CPC ...... G06V 10/82; G11B 27/34; G11B 27/031; G11B 27/28
See application file for complete search history.

(56) References Cited

U.S. PATENT DOCUMENTS

| | | |
|---|---|---|
| 10,643,074 B1 | 5/2020 | Mcaninly et al. |
| 11,272,256 B2 | 3/2022 | Pate et al. |
| 2002/0080163 A1 | 6/2002 | Morey |
| 2005/0086690 A1 | 4/2005 | Gilfix et al. |
| 2015/0106856 A1* | 4/2015 | Rankine ............. H04N 21/8456 725/60 |
| 2015/0341410 A1* | 11/2015 | Schrempp ............. H04L 65/765 709/231 |
| 2017/0083762 A1 | 3/2017 | Segalovitz et al. |

\* cited by examiner

CONNECTED INTERACTIVE CONTENT DATA CREATION, ORGANIZATION, DISTRIBUTION AND ANALYSIS

BACKGROUND OF THE INVENTION

The present invention is directed to an improvement of U.S. Pat. No. 9,516,251, which teaches a method of how to pre-process a video to precisely define an object in the video so that the object can be easily selected by a user while watching the video, and after selecting the object, further action relating to the object can be taken. However, the method disclosed in U.S. Pat. No. 9,516,251 needs improvement. Example: During the pre-processing, objects are difficult to recognize at various camera angles; including pan, truck, tilt and perspective; and under varying lighting circumstances including, hue, saturation, brightness, contrast, and particularly shadows; making consistent precise object identification problematic.

FIG. 1 is an illustration of an example of prior art identification of objects of interest. Illustrated objects exemplified herein include a sofa or couch 101, two pillows, unnumbered, end table 102, and lamp 103. Existing prior art tagging method use bounding boxes 101, 102, 103 or pre-defined geometric shapes (not shown) that do not allow pixel precise object recognition. This limits the ability of ensuring that the object is properly identified when it appears in other video frames.

During the past decade consumers grew more and more oblivious to traditional methods of advertising, including pop-ups and other intrusive ads, and empirically more intolerant of traditional linear broadcast, cable, satellite TV, and digitally stored content and certain Internet connected content commercials, such as the 10-15-30-second commercials. Today in the connected content world, commercials are found as non-skip able entities frustrating viewers even more. Viewers no longer want to be force-fed advertising, and certainly don't appreciate the interruptions which traditional advertising engenders.

In 2019, connected content (internet-connected) will surpass 200 million users in the U.S. alone. Worldwide, all types of connected content has changed the face of how humans live their lives and conduct themselves. The astonishing growth of connected content has changed the world. For instance, connected content is set to overtake traditional linear broadcast, cable, satellite TV, and digitally stored content, becoming the first option advertisers choose when they want to reach engaged audiences. Connected content advertising is premium, viewable, non-skippable, addressable and transactional with precision and efficiency.

Today, not even high-profile live events stop cord cutters of traditional linear broadcast, cable, satellite TV, and digitally stored content because viewers can access this content via streaming services. The growth of connected content reflects a paradigm shift in entertainment options and new ways advertisers and viewers can engage.

For instance, with respect to connected content, including traditional linear broadcast, cable, satellite TV, digitally stored content, desktop, laptop, tablets and other mobile devices, commercial advertisements have traditionally been produced with the intent of the viewer watching the content in real time. Connected content publishers are confronting subscription fatigue and are necessarily again moving to ad-supported monetization strategies. The amount of ad-supported connected content is increasing dramatically, adding more opportunities for brands to reach new audiences. Connected content viewers can also access video content via the TV itself (a smart TV), a connected content device (Roku® or Apple® TV) or a gaming console (PlayStation®, Xbox®, etc.) exponentially expanding the opportunities for monetization.

However, for connected content viewers the next horizon is to address the non-skippable aspects of video content advertising. Viewers do not want to be force fed advertising and will take any steps possible to skip commercials; including recording traditional linear broadcast, cable, satellite TV and digitally stored content; playing it back at a later time than its original broadcast, only to be able to fast forward through commercials.

For advertisers, important factors include access and analytics as well as improving accuracy, precision and providing more in depth information about engagement and interaction with video. Video content providers have two important goals for the delivery of their connected content:

Provide viewers a rich non-intrusive experience.

Capture user-interaction analytics that report on the viewed content experience.

To achieve these interactivity goals at scale in a world without common video player functionality, advertisers would have to develop multiple specialized versions of their ad created for every unique video player—an expensive proposition that at best does not scale well and more than likely is not possible.

For both viewers and advertisers there is need for an improved method and system for creation, organization, distribution and analysis of connected content. At the same time trained neural networks have become commonplace in all of today's technologies growing from infancy in the early 1950's to nearly required in order to scale technology today.

SUMMARY OF THE INVENTION

The present invention uses a coined expression, KERVdata, which is defined herein as multilevel hierarchical data using selected pixel clusters defined by pixel thresholds which form object edge boundaries, which are defined by vertices, in order to identify products or objects in internet connected interactive content. The KERVdata is generated by a variation of the R-CNN algorithm known as the Mask R-CNN algorithm establishing a training data set; and experimentally determines a weighted combination of object signal-containing characteristics, and applies linear regression algorithms to produce precise pixel edge boundaries defined by vertices. The applied linear regression algorithms create a neural network used to describe how the system recognizes various shapes, multiple coexisting contextual features; including camera angles such as pan, truck, tilt and perspective; and varying lighting circumstances including, hue, saturation, brightness, contrast and particularly shadows; allowing for consistent, precise object identification defined by edge boundaries and vertices.

The application of pre-labeled category training data is used to teach the system how to recognize the pixel edge boundaries of specific objects. Such pre-labeled category training data generates data that is incomplete or inaccurate. To obtain more accurate results, an automated, image recognition system is used in which a recursive process collects, trains, and retrains the pre-labeled category training data until they achieve a standard level of quality in recognition and pixel edge boundary results defined by vertices. The resulting KERVdata object identifier defines the data's presentation through a precise overlay including vectors representing the distance and direction, from each edge pixel having an associated contextual bounding box displaying a pixel edge boundary, defined by vertices, predictably identifying a precise overlay based on the vertices of the object. For each pixel in the input image, the pixel threshold feature represents the most accurate object edge boundaries displayed in a contextual bounding box defined by vertices, resulting in a precise overlay identifying the object.

Additionally, the resulting KERVdata pixel threshold vertices can be manually manipulated using polygon editing tools, after using the automatic image recognition system as defined herein to obtain more precision if necessary.

In some cases, the polygon editing tool may be used to identify new objects, but it is primarily used to correct or add to automatically recognized objects. The finalized object KERVdata allows its presentation through interactive engagement opportunities through precise overlays encompassing only the area inside the pixel edge boundary of objects vs existing prior art methods, including hotspots using pre-defined geometric shapes or regions that do not allow pixel precise object recognition.

Initially, new video content is processed by uploading a standardized video format (AVI, FLV, WMV, MP4, MOV, etc.) into a server. Key scenes are then identified using well known prior art techniques, which represent content of interest within the video. These key scene frames are then analyzed for relevant objects, which are identified by the previously trained neural-network object identifiers. When scanning a scene for objects, the content creator has the option to specify which categories are included or excluded. This ensures that the objects identified are from relevant categories the content creator intends to show. The results from these identifiers are associated and stored in a KERVdata database.

By providing a mechanism for quickly and accurately identifying objects of interest in a video, the invention provides a non-intrusive way to enable and empower the viewers of video content to decide what they want to explore for information and purchase. Ultimately, people will watch television programming and music videos not only for content, but also to easily facilitate their buying behavior when they see what they want on the screen, including the style of clothes, furniture, and accessories, and can simply touch, i.e., select, the object in the video to buy the product or get more information.

The method and system described herein uses a trained neural network to recognize pre-learned objects, which, once identified, draws the pixel edge boundaries of objects up to sixty (60) times faster than prior art techniques, and provides more accurate object recognition. Interactive engagement opportunities are precise overlays encompassing only the area inside the pixel edge boundary of an object vs existing prior art tagging methods, including hotspots using prior art bounding boxes or pre-defined geometric shapes that do not allow pixel precise object recognition.

This new system and method enables a content provider to continue to monetize their programming in a way that is acceptable to the viewer and not distracting to the programming and puts the control of advertising in the viewer's hands. The KERVdata moves connected content from an assumptive advertising model where advertisers are assuming viewers are watching (and interested), to a measurable advertising model, where viewing and purchasing behaviors are captured, thus allowing advertisers to quickly assess effectiveness of their advertising dollars. Placement of interactive and engageable objects in a video then becomes a measurable revenue stream. In other words, an active rather than passive revenue model, and allows viewers to have complete control over their own viewing experience, choosing which scenes and objects they want to engage with because the ads are embedded in the video for viewers to explore, eliminating the need for intrusive non-skippable forced advertising.

Also disclosed is a method for utilization of the KERVdata called Interactive Screen Match (ISM). ISM connects non-Internet connected content, i.e., traditional linear broadcast, cable, satellite TV and digitally stored content, to matching internet connected content that must include interactive KERVdata based content. For example, A video which includes objects with associated KERVdata is presented to connected content users after receiving an audio stream sample from the user's connected content microphone. The audio sample, averaging 3.5 seconds, emanates from either a broadcast content device, traditional linear broadcast, cable, satellite TV and digitally stored content or internet connected content. This sample is sent to remote servers for analysis and queried within a database of audio fingerprints to find the closest matching content, retrieving layers of KERVdata object identifiers with objects defined by precise pixel edge boundaries within a frame or video clip. ISM allows for the presentation of multiple layers of KERVdata object identifiers on the connected content sampling device, enabling the user to have precisely defined interactive engagement with unlimited objects, expanding the distribution and monetization of all KERVdata object identified connected content.

The ISM distribution expansion embodiment which uses known audio recognition techniques, listens for original non-Internet connected content; traditional linear broadcast, cable, satellite TV and digitally stored content and pulls a scene from the original state content across to a connected interactive KERVdata object identified content display platform such as a desktop, laptop, tablet and other mobile device. By expanding the reach of applicant's KERVdata object identified processed interactive connected content from traditional linear broadcast, cable, satellite TV and digitally stored content, the ISM audio screen-match measurably increases the actual number of interactive connected content users and therefore increases user engagement opportunities for KERVdata object identifiers.

DETAILED DESCRIPTION OF THE INVENTION

In the following detailed description of example embodiments, reference is made to the accompanying drawings which show by way of illustration only and are not limited to the specific example embodiments in which the subject matter may be practiced. These embodiments are described in sufficient detail to enable those skilled in the art to practice the subject matter, and it is to be understood that other embodiments may be utilized and that logical, mechanical, electrical, software and other changes may be made without departing from the invention. The algorithmic descriptions and representations of the various embodiments are to be construed as exemplary only and do not describe every possible instance of the subject matter. The following detailed description is, therefore, not to be taken in a limiting sense, and the scope of the covered subject matter is defined only by the appended claims.

Pre-Processing of Video Content (Data Creation)

Figure 2A:
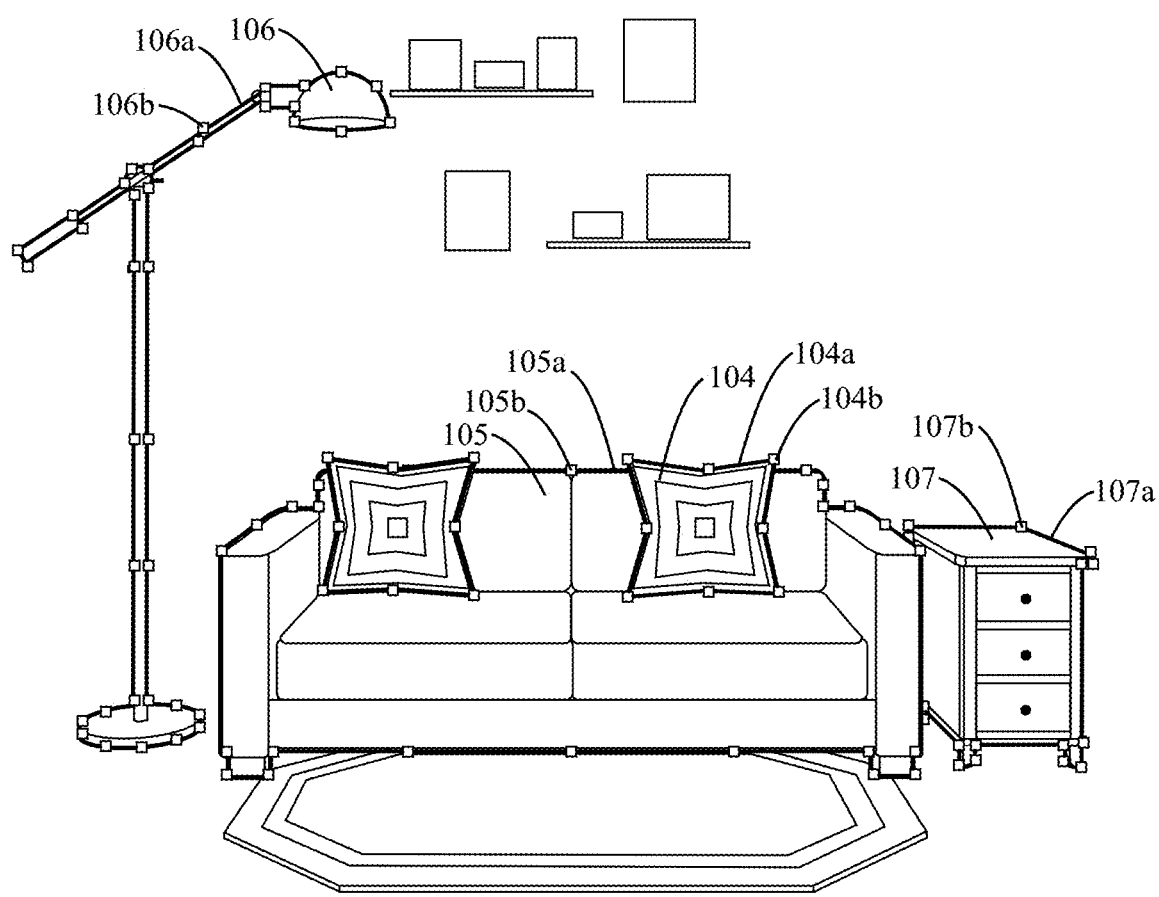
FIG. 2A is an illustration of using KERVdata object identifiers to identify objects of interest.

KERVdata is generated by using the Mask R-CNN algorithm, establishing a training data set; and through the process of training a neural network, determining a weighted combination of object signal-containing characteristics; and converging on a highly optimized configuration of neural weights to produce precise pixel edge boundaries 104*a*, 105*a*, 106*a*, and 107*a* shown in FIGS. 2A. In accordance with the prior art Mask R-CNN technique, the optimized weights within a properly trained neural network are able to identify objects and trace the pixel edge boundary with a reasonable level of accuracy.

Figure 3:
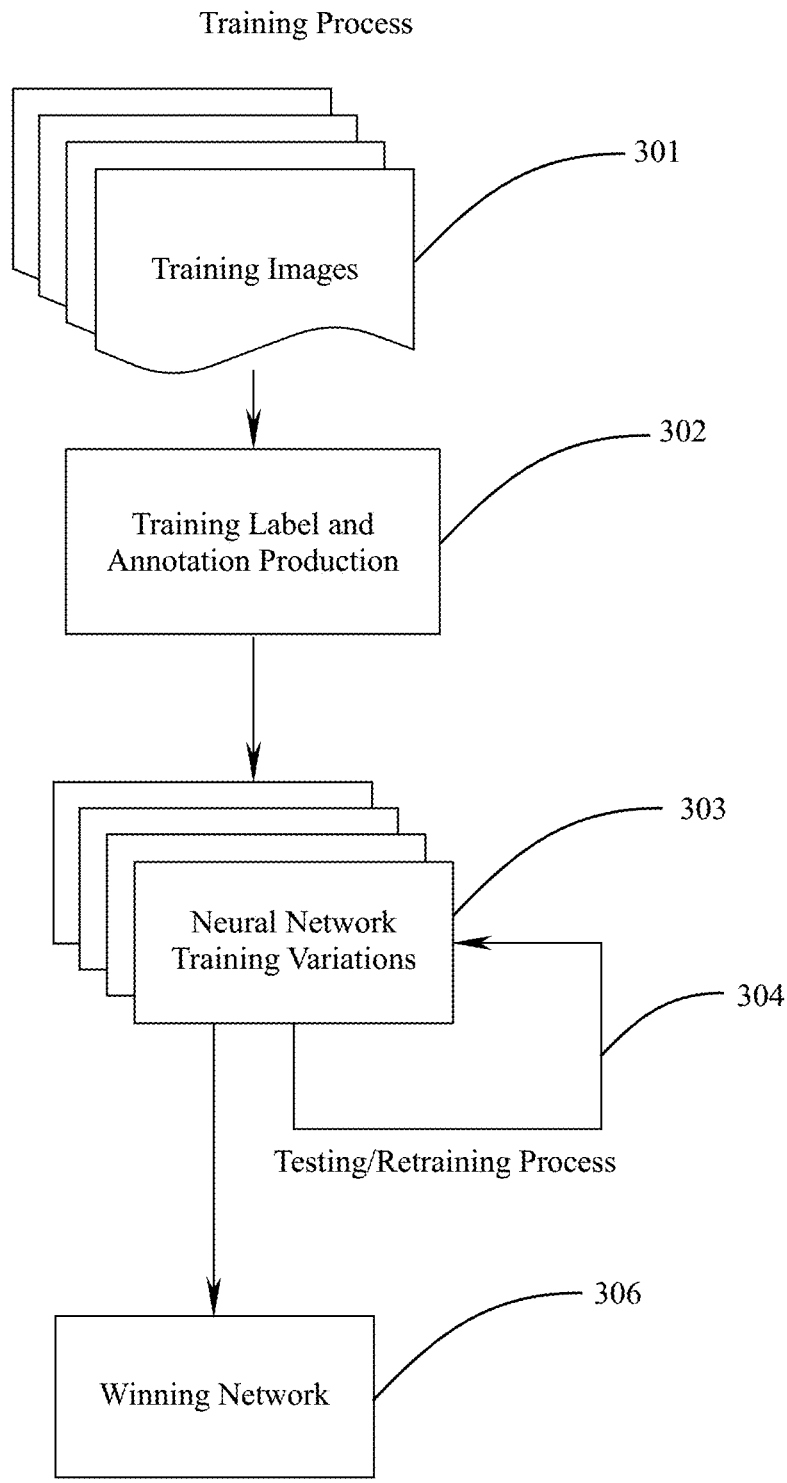
FIG. 3 is a flowchart depicting the process of training neural networks to recognize objects in images.

FIG. 3 is a flowchart depicting the process of training neural networks to recognize objects in images. It is a recursive process used to collect, train, and retrain pre-labeled category training data until they achieve a standard level of quality in recognition and pixel edge boundary results. As is standard for neural network training, this process begins with creating pre-labeled data sets showing examples of the objects the system is to recognize. The first step represents the collection of training images 301 as input to the process. Hundreds, sometimes thousands of images that illustrate the object categories of interest are downloaded from royalty-free or paid sources, stored in a database and tagged with the relevant object category each individual image is related to. Typically, such tags are stored as metadata associated with the image data. The training images depict example objects, as well as accurate polygonal training labels and annotations of the various object categories involved. These categorized images serve as inputs to the next step for training label and annotation production 302. Each relevant object in each image is manually traced and labeled using off-the-shelf annotation software. These labeled, annotated examples teach the system underlying patterns for recognition. A variety of camera angles, lighting scenarios, and other contexts are necessary for the system to generalize the underlying patterns. Although steps 301 and 302 are manual steps, they are performed only once when each new category is established. These categorized and annotated sets of images, also known as training data sets, feed into the next step, 303, in which neural networks are shown the examples, tested, and retrained 304, using a standard neural net training process. As needed, new training data points can be added to or removed from the training set, allowing for retraining the neural networks and further optimization. Each iteration improves the quality of the network score. The score is based on how close its results are to the training and test data sets. After the quality stops improving, as determined by scores being within a pre-determined threshold, the resulting, highly optimized winning networks produce KERVdata object identifiers, which defines a precise overlay including vectors representing the distance and direction, from each edge pixel having an associated contextual bounding box displaying a pixel edge boundary, defined by vertices predictably identifying a precise overlay defined by the vertices of the object. For each pixel in the input image, the pixel edge boundary represents the most accurate pixel edge boundary defined by vertices. This results in a precise overlay identifying the object. The winning network with the best score is selected 306 and outputted. This network can be used to identify objects in its trained category with inputs it has not seen before with reasonably good quality. In this connection, as is well known in the art, neural networks are layers of connected nodes. Although the set of weighted values produced using the Mask R-CNN algorithm are typically hundreds of megabytes in size, they can be efficiently analyzed to ensure proper identification of objects represented by the set of weighted values.

Figure 1:
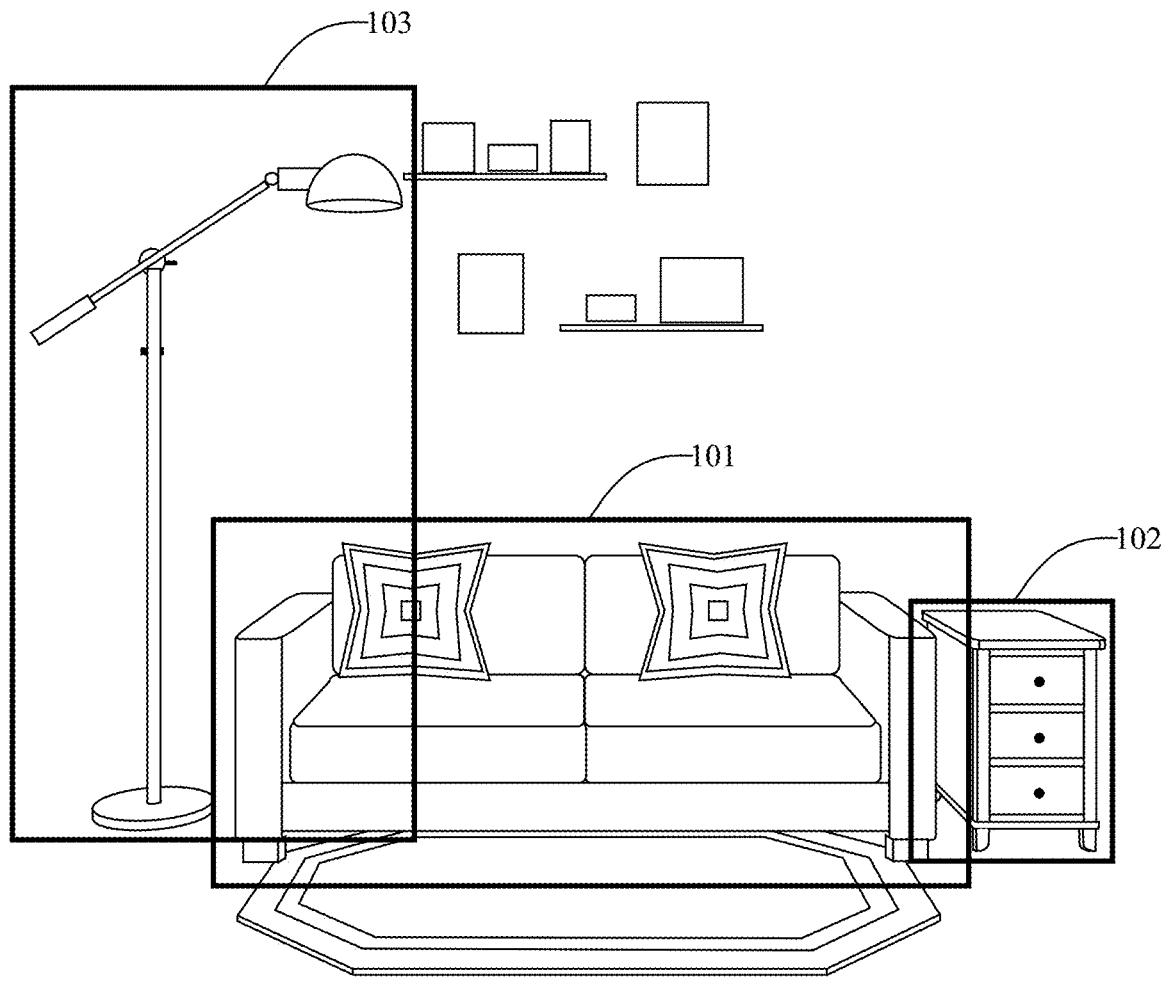
FIG. 1 is an illustration of an example of prior art identification of objects of interest.
Figure 4:
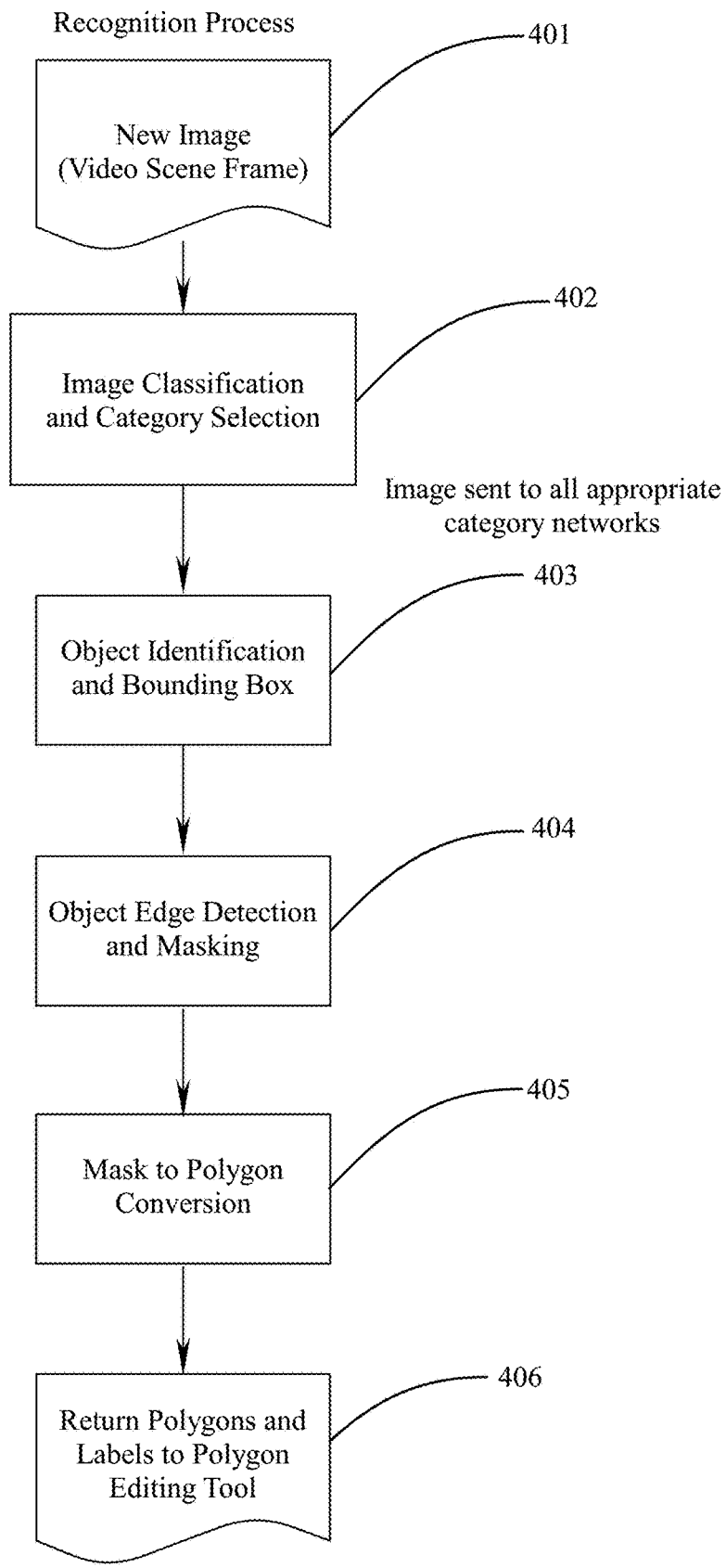
FIG. 4 is a flow chart depicting the process of recognizing objects and their boundaries within video frames or other input images.

FIG. 4 is a flow chart depicting in more detail the process of recognizing objects and their boundaries within video frames or other input images. The first step 401 receives a new image (video scene frame) from a server storing the video. Next, the image is classified 402 using a 3rd party image classification service to determine which category of networks should be invoked. This is a performance optimization, as well as prevention of odd results based on incorrect categorization. The image is sent to all appropriate category networks in step 403, where objects are initially identified for category and bounding box (see prior art FIG. 1 which shows bounding boxes 101, 102 and 103). This phase is relatively fast, and utilizes prior art techniques in object recognition and bounding box rendering. These bounding boxes are used to focus the image for the next step, objects edge detection and masking. The identified objects then go through the edge detection and masking process 404 which produces a pixel-level mask that defines the boundary of the object. Using the Mask R-CNN algorithm, the pixels in the image are masked based on properties of the object such as shape, color, perspective, etc. This mask moves to the next step, 405, where polygon conversion occurs. The purpose of this step is to create a polygon annotation describing the shape and boundary of the object at hand. This polygon, along with its corresponding object label is returned to the polygon editing tool via the KERVdata database in the final step, 406. All the recognized object labels and polygons are returned to the polygon editing tool which alerts the video editor, who could also be the original content creator, to review, correct and approve all object content, including the accuracy of the polygon shape, as well as the title, description and linkup URL assigned to the object.

The following is a further description of automatic image recognition used in conjunction with the polygon editing tool to identify objects. In this case, referring to FIG. 2D, vertices 105*b* of the couch 105 are added with the polygon editing tool in an area obscured by the end table 107 and not visible in the base view FIG. 2A. The polygon editing tool is a common method of correcting pre-labeled category training data used in neural network systems to allow rapid corrections of errors or irregularities. When used, it facilitates the ability of the video editor to review, correct and approve the automatically generated content. The application of pre-labeled category training data is used to teach the system how to recognize the pixel edge boundary of specific objects. A recursive process is used to collect, train, and retrain the pre-labeled category training data until they achieve a standard level of quality in recognition and pixel edge boundary results. The resulting KERVdata object identifier defines a precise overlay including vectors representing the pixel edge boundary of each object in each scene of a given video.

This example depicts automatic image recognition used in conjunction with the polygon editing tool to identify objects. The polygon editing tool is a common method of correcting pre-labeled category training data used in neural network systems to allow rapid corrections of errors or irregularities. Editable pixel vertices 105*b* are generated by KERVdata object identifiers.

Vertices may be manipulated using the polygon editing tools allowing for various types of customization of visual references displayed in video content. KERVdata object identifier pixel level precision allows for very granular taxonomies to be mapped down to the object level inclusive of categorization. An example of the object level customization features of KERVdata using vertices is described as Object-Glow Fill: As users engage, individual objects glow around their pixel-edges (defined by vertices such as 104*b*, 105*b*, 106*b* or 107*b*) to indicate interactivity. The specific color of global object glows for each video can be customized. Other techniques used to indicate objects which have been processed for interactivity by the end user are described below with reference to presentation technology.

II. End User Object Selection of Pre-Processed Video (Data Organization)

Once the video has been processed and the resulting KERVdata object identifiers provide the pixel edge boundary of each object in each scene of a given video, an end-user watching the video can interact with objects in the video by selecting them, after which additional information or product purchases can be made.

Figure 2B:
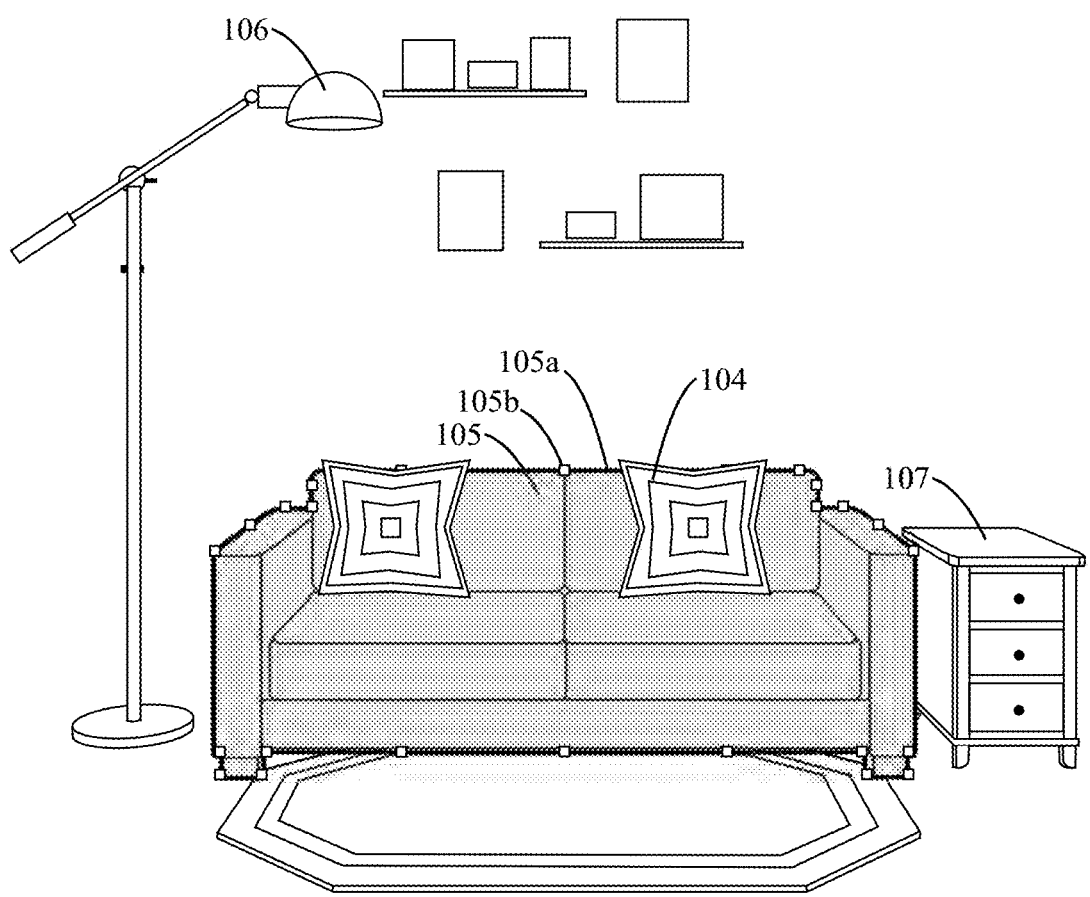
FIG. 2B is an illustration of an example of FIG. 2A with one object of interest selected by an end-user.

FIG. 2B is an illustration with one object of interest selected by an end-user. Illustrated objects exemplified herein include a sofa or couch 105, two pillows 104, end table 107, and lamp 106. Here the end-user has selected the sofa 105. The sofa is shaded and displays its pixel-edge boundary 105*a* and its editable vertices 105*b*. Although the vertices are not visible to the end-user, they are included since they show how the polygon drives the presentation which the end-user sees.

Figure 2C:
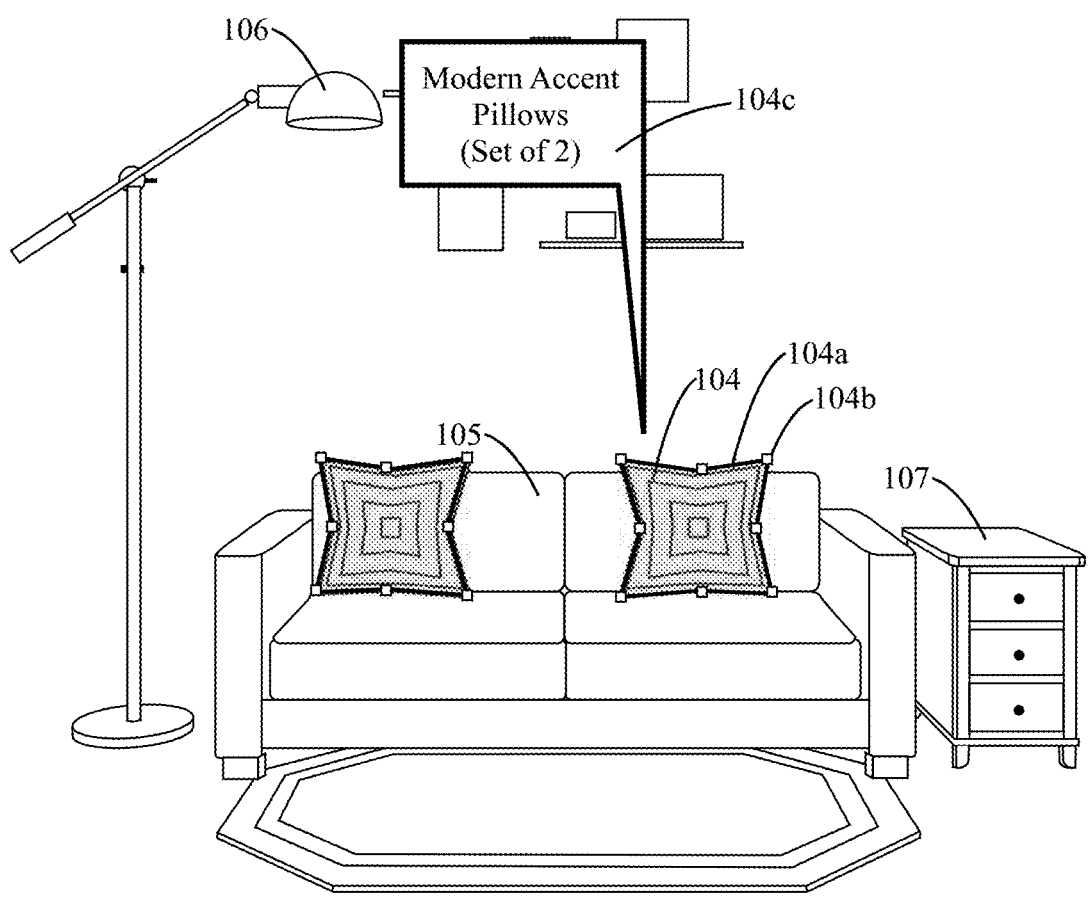
FIG. 2C is an illustration of an example of FIG. 2A with another object of interest selected by an end-user.

FIG. 2C is an illustration with another object of interest selected by an end-user. Illustrated objects exemplified herein include a sofa or couch 105, two pillows 104, end table 107, and lamp 106. Here the end-user has selected the pillow 104 to obtain more information regarding the product. The pillow is shaded and displays its pixel edge boundary 104*a* and its editable vertices 104*b*. The editable vertices are used by an interactive overlay to show a glow or other selectable object feature to allow users of Internet Connected Video Content (ICVC) to identify specific objects 104*c* that "link out," for example, by providing a hyperlink, for more information or to make a purchase by directing the user by a hyperlink to a web page from which a purchase can be made. In this manner, an interactive interface is provided to enable the end-user to easily select an item of interest, and receive feedback that the item has selected so that the user can, via an embedded hyperlink, proceed as noted above.

While a user is actively watching a video, the user is presented with a configurable interface indicating that the video contains interactive content. The indication that the video contains interactive content is a combination of a "call to action" message at the beginning of the video, a menu listing the available scenes on one side of the video frame, and/or a button in the video frame labeled with a message stating that the video is interactive. The configurable interface consists of the "call to action" messages, scene list menu, and primary button, and can be configured by the content creator to enable or disable any of these features, as well as edit the textual labels for each. In all configurations, by clicking or touching these interface elements, the user can opt-in to launching an interactive frame through this configurable interface. When a user opts-in to launch interactivity, the interface pauses the original video content and displays an interactive overlay consisting of a key frame from the video scene the user was watching. In this interface mode, the user can see and interact with all the individual objects which can be interacted with from that scene, navigate to other scenes, or exit the interactive overlay and resume the original video content. Each individual object which can be interacted with is highlighted in sequence to indicate to the user which areas are interactive. When an object is selected, the display changes to show all known object details, including the title, description, call to action, click-out product URL, polygon boundary within the original frame image, and isolated product image.

Figure 2D:
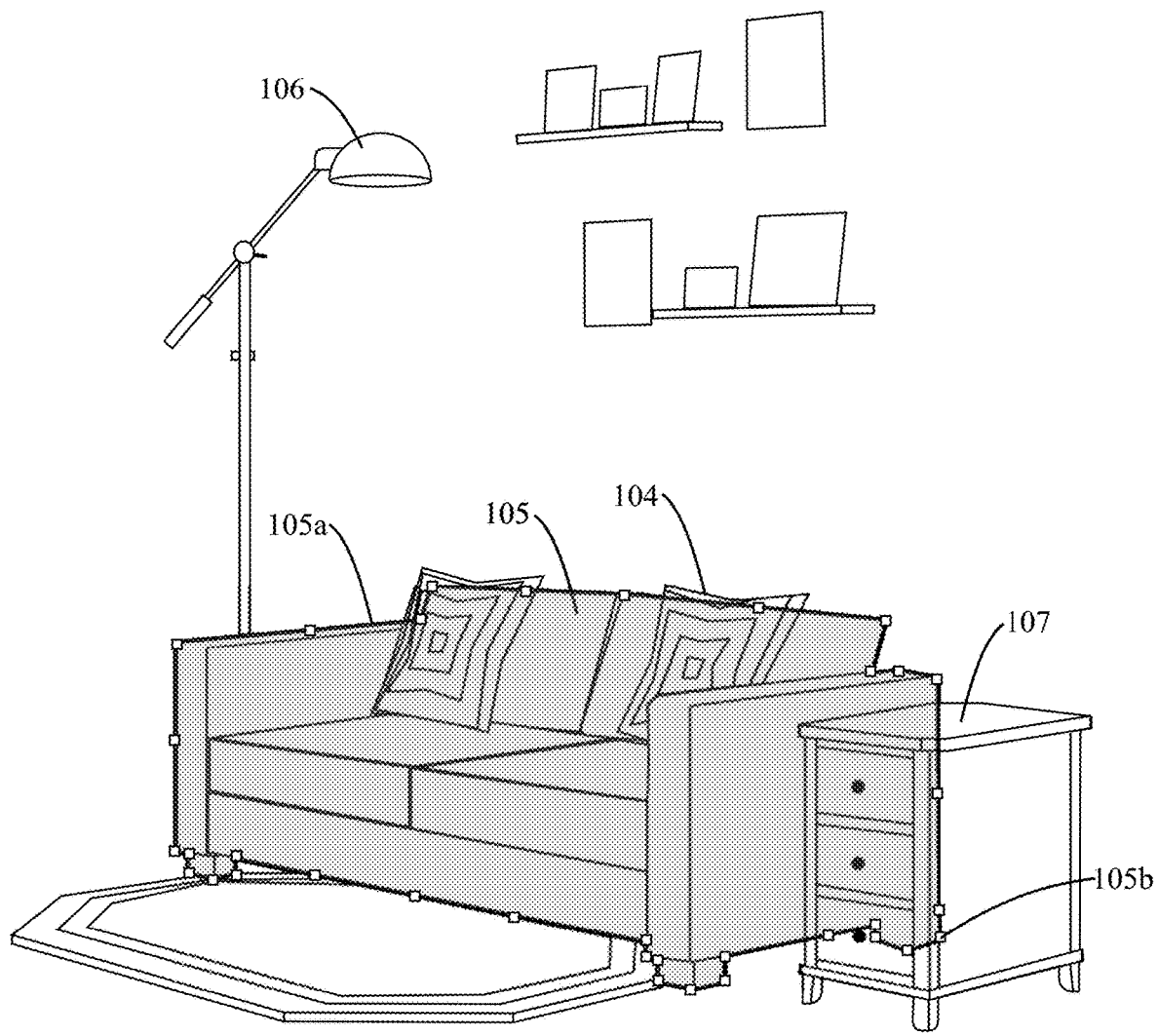
FIG. 2D is an illustration of an example of the scene depicted in FIG. 2A at a different viewing angle showing object selected by an end-user.

FIG. 2D is an illustration of with an object of interest 105 selected by an end-user. Illustrated objects exemplified herein include a sofa or couch 105, two pillows 104, end table 107, and lamp 106.

Figure 2E:
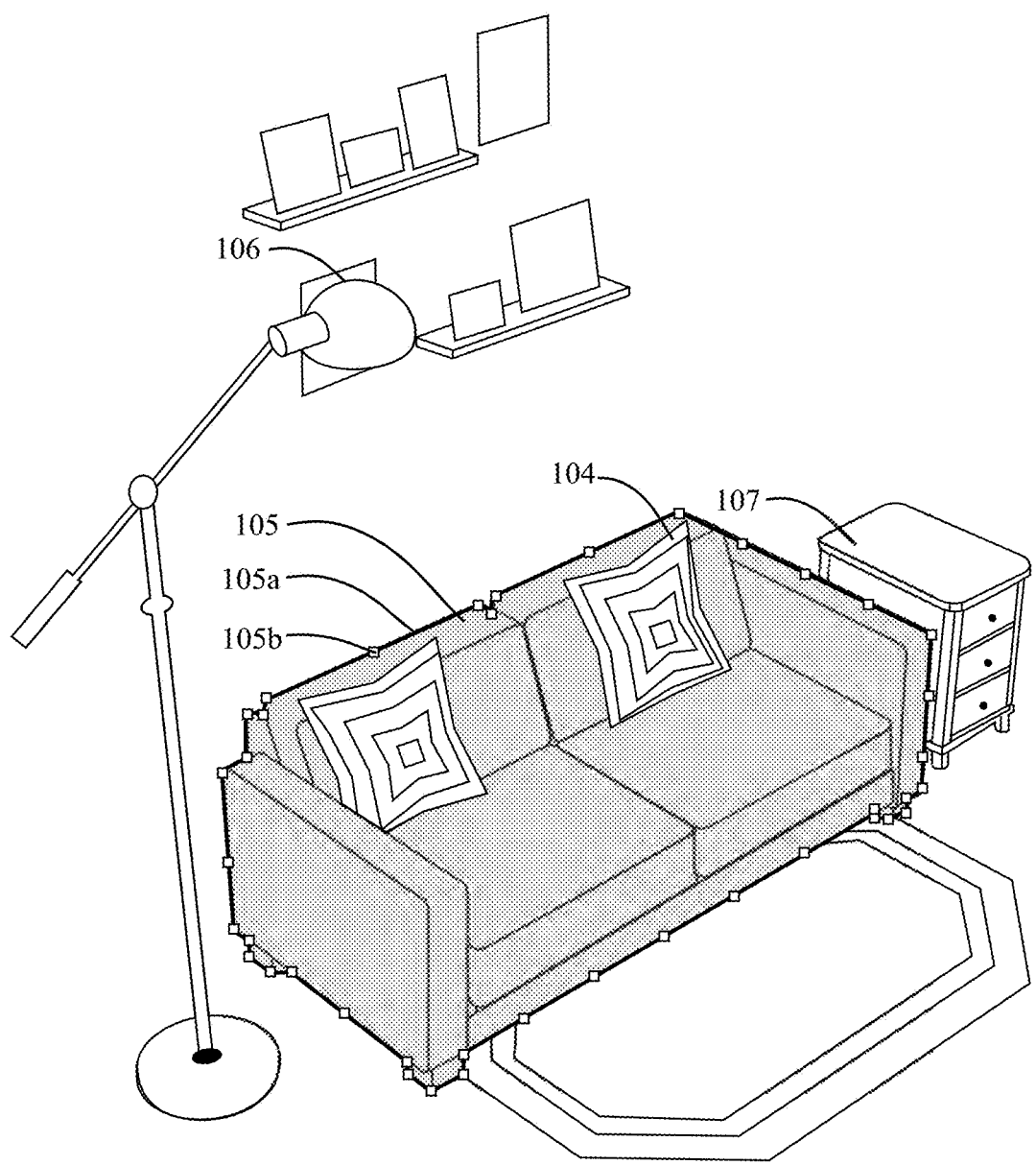
FIG. 2E is an illustration of an example of the scene depicted in FIG. 2A at a different viewing angle showing object selected by an end-user.

FIG. 2E is an illustration shown at an overhead angle with an object of interest 105 selected by an end-user. Illustrated objects exemplified herein include a sofa or couch 105, two pillows 104, end table 107, and lamp 106. In this case, vertices of the side of the couch 105 are added in areas not visible in the base view shown in FIG. 2A.

III. End User Interaction with KERVdata Object Identifiers (Data Distribution)

Figure 5:
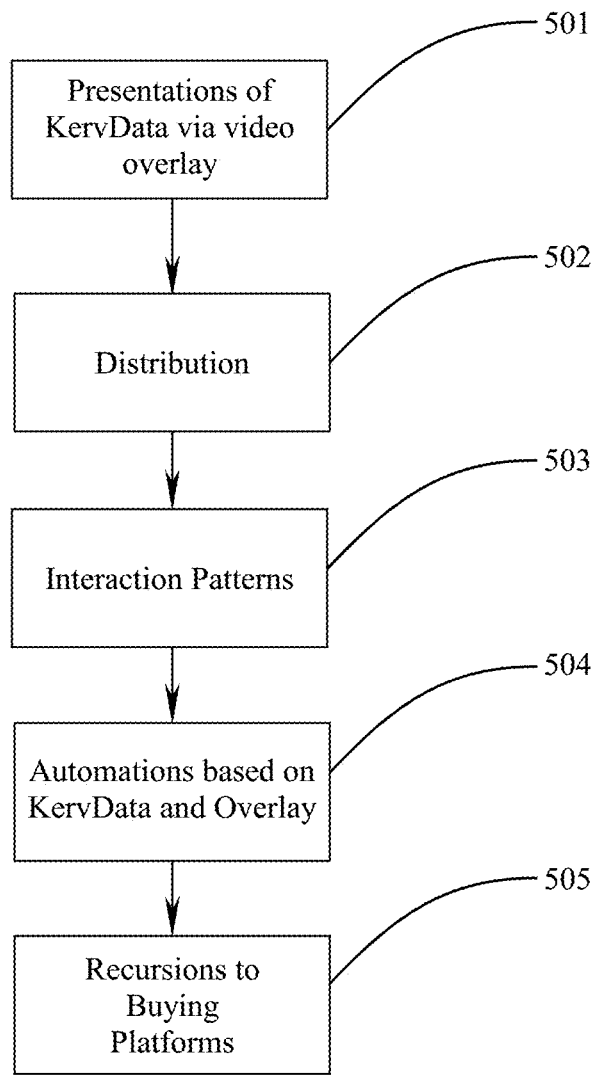
FIG. 5 is a flow chart describing how distributed KERVdata object identifiers are configured and continually improved to provide a unique interactive user experience.

FIG. 5 is a flow chart describing how videos distributed with KERVdata provides a unique interactive user experience. Following the recognition processes, the KERVdata will be presented 501 via an interactive video overlay that can be configured for the presentation of the KERVdata object identifiers that are distributed to consumers. KERVdata object identifier object level insights are used to optimize the distribution of the interactive video overlays. KERVdata object identifiers are distributed via on-line/connected video platforms and content via agnostic mechanisms such as tags or codes. These configurations can vary, even for the presentation of the same base KERVdata object identifiers (using, for example, auto-populated scenes, carousel configuration, glow color, object text, etc. as detailed below) for the sake of driving a unique interactive experience. This allows the KERVdata object identifiers to be distributed 502 via websites, applications and other connected methodologies. Once the KERVdata object identifiers are distributed, the interaction patterns 503, that is, an interactive interface for users who interact with certain KERVdata object identified objects, sequence of objects, vertical of objects, etc., are tracked. This allows the KERVdata object identifiers to be presented for further interaction via websites, applications and other connected methodologies. After the interactive overlay has been distributed, the end user has the opportunity to interact 503 with the KERVdata object identifiers. Specifically, the interactive overlay interacts with the KERVdata object identifiers to provide an object level visual experience. Each user may be presented with a different, object level and automated 504 sequence of KERVdata object identifiers. Since each user's experience is unique, they receive a different, object level experience via an automation 504 based on KERVdata object identifiers. Since KERVdata object identifiers are distributed via online/connected video platforms and content via agnostic mechanisms such as tags or codes, further user interaction via buying platform websites 505, applications and other connected methodologies are possible. This information is used to target users with specific configurations of KERVdata object identifiers based on their past interactions. Newly organized groups of users can be identified and used to improve and update KERVdata objects and the distribution mechanisms.

Interactive screen match (ISM) is a technique used to connect non-Internet connected content such as traditional linear broadcast, cable, satellite TV and digitally stored content to matching internet connected content on desktop, laptop, tablet and other mobile device, that must include interactive KERVdata content. For example: a video with KERVdata connected content is presented to connected content users after receiving an audio stream sample from the user's connected content microphone. The audio sample, averaging 3.5 seconds, emanates from either a broadcast content device such as traditional linear broadcast, cable, satellite TV and digitally stored content, or internet connected content such as a desktop, laptop, tablet and other mobile device. A database of audio fingerprints is sent to remote servers for analysis and queried to find the closest matching content, retrieving layers of KERVdata connected content within a frame or video clip. ISM allows for the presentation of multiple layers of KERVdata on the connected content sampling device, enabling the user to have precisely defined interactive engagement with unlimited objects, expanding the distribution and monetization of all KERVdata connected content.

In this manner, the ISM distribution expansion embodiment listens for original non-Internet connected content; traditional linear broadcast, cable, satellite TV and digitally stored content, and pulls a scene from the original content across to a connected interactive KERVdata content display platform. By expanding the reach of KERVdata interactive connected content from traditional linear broadcast, cable, satellite TV and digitally stored content, the ISM audio screen-match measurably increases the actual number of interactive connected content users and therefore increases user engagement opportunities for KERVdata connected content.

Figure 6:
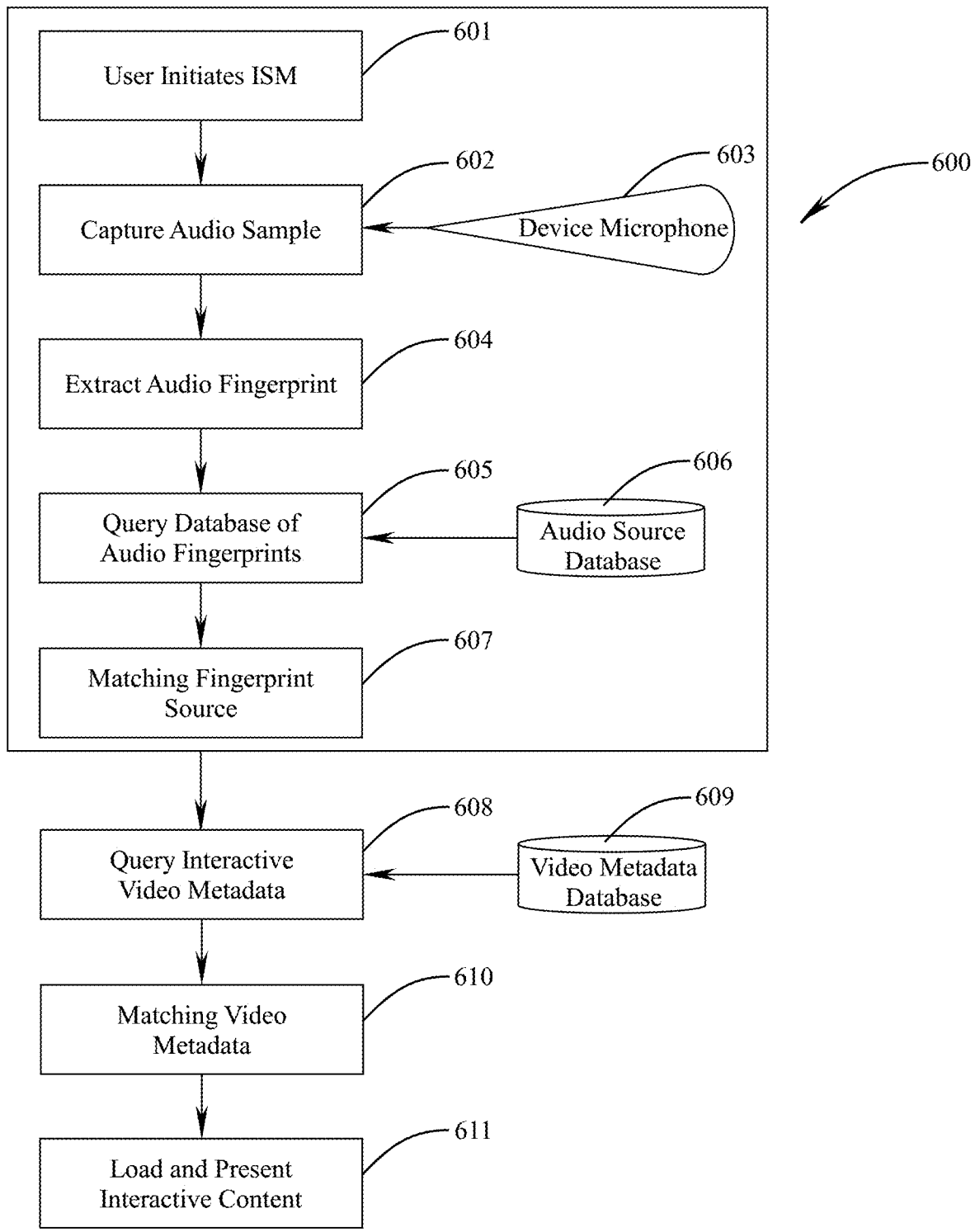
FIG. 6 is a flowchart depicting the steps involved in matching audio fingerprints with a KERVdata object identified presentation on an end user's connected device.

FIG. 6 is a flowchart depicting the ISM embodiment resulting in audio match and interactive KERVdata object identifiers for presentation on an end user's connected device. The user initiates 601 the ISM process via a connected device with an active microphone. With permission to access the device microphone, the next step captures 602 an audio sample via the device microphone 603. The audio sample is typically 3-5 seconds long, allowing for enough information to reliably search and match the audible content. Next, the sample is analyzed 604 to extract audio fingerprints. These fingerprints are based on various features or landmarks of the sample, such as frequency, volume and pitch, to normalize and isolate key features needed to match and identify the source of the audio. This fingerprint is passed to the next step where the database of audio fingerprints is queried 605. The audio source database 606 contains searchable audio fingerprint records aligned with original source video and video metadata records. These fingerprint records are produced initially when each video is imported to a server by analyzing the audio track of the video file. When a match 607 is found, the matching source record is passed onto the next step where the associated interactive KERVdata object identifier is loaded 609 from a KERVdata video metadata database and is queried 610 for matching video metadata. The matching result, returned is finally loaded and presented 611 to the end user on their connected device.

The following code sample describes the initialization phase of the ISM feature. This includes rendering a basic user interface allowing the user to initiate ISM, and establishing handlers for interaction with this interface. It is front-end code that executes locally on the user's device. When the user initiates ISM by tapping the button, the device will record a 3.5 second audio sample to send it to a remote server for analysis. Steps 1 a-b and 2 a-b are labeled in the code with code comments, and are defined as the following:

1a. render button—the user triggers the ISM feature
    1b. initiate the process when the user taps or clicks the button
    2a. access the microphone and record an audio sample for 3.5 seconds
    2b. send this sample to server for analysis and matching content search Here are the associated algorithmic descriptions and representations used by those skilled in the data processing arts representing critical lines of code that demonstrate the usage aspects of ISM:

```
// 1a
ismButton = drawButton( )
ismButton.label = "Tap to KERVit"
// 1b
ismButton.onTap(recordSample)
// 2a
function recordSample( ):
   recorder = new Recorder(SYSTEM.MICROPHONE)
   recorder.record( )
   setTimeout(stopRecording, 3.5)
function stopRecording( ):
   recorder. stop( )
// 2b
audioFile = recorder.exportWAV( )
r = httpRequest('api/audio-upload', audioFile, handleReturn)
```

When the sample is received by the server 606, audio fingerprints are extracted (604) from the sample to search for matching sources. The database of audio fingerprints (605) is queried (606), using a fuzzy match on key fingerprint features from the provided sample to return the closest matching fingerprint source (607).

The following code sample describes the analysis phase of the ISM feature. This includes extracting fingerprints of key features of the received audio sample, searching the database for the closest matching audio segments, and responding with the result. It is back-end code that executes remotely on servers based on the provided audio sample. When the audio sample is received from the previous phase, it is brought into scope and is used to establish a data format to track the key fingerprints and landmarks. Next, the code reads the decibel level of each segment of the audio sample to calculate the positions of peak levels. Any points in the segment that exceed this peak are marked as part of the fingerprint. The combination of the number of peaks and their positions in the sample provide enough information to create the fingerprint, which is a lightweight data structure for simple comparison of different audio clips. Using this fingerprint, the code searches the database for close matches. These candidate matches are compared to each other to determine which one is the closest to the original sample. If the best match is at least an 85% match with the original, it is returned as the result. Otherwise, an error is returned to notify the user that there was not a matching result. Steps 3 a-b and 4 a-b are labeled in the code with code comments, and are defined as the following:

3a. receive audio sample
3b. break apart into landmarks and fingerprints
4a. search database to find matching fingerprints
4b. respond with best match that has above minimum accuracy Here are the associated algorithmic descriptions and representations used by those skilled in the data processing arts representing critical lines of code that demonstrate usage aspects of ISM:

```
// 3a
input = POST.audioFile
// 3b
fingerprint = [ ]
sample_point_decibel = [ ]
sample_point_position = [ ]
for point in input.segments:
  sample_point_decibel.append(point.decibel)
  sample_point_decibel.append(point.position)
peak level = Math.StandardDeviation(sample_point_decibel, 2)
for point in sample_point_decibel:
  if point > peak_level:
    fingerprint.push({
      decibel: point,
      position: point.index
    })
// 4a
match = { }
for chunk in fingerprint.chunk(5):
  result = query(SELECT FROM fingerprints fp
    JOIN sample_index si ON
      si.fingerprint_id = fp.id
    WHERE si.signature = chunk.signature)
```

-continued

```
  if result:
    match[result.content_id] += 1
  greatest_match = ''
  greatest_count = 0
  for content_id in match:
    if match[content_id] > greatest_count:
      greatest_match = content_id
      greatest_count = match[content_id]
// 4b
// only return 85%+ match quality
if greatest_count/fingerprints.length( ) > 0.85:
  return greatest_match
else:
  return 'Error: Match not found'
```

The following code sample describes the result presentation phase of the ISM feature. This includes pulling all data associated with the matching result from the previous phase, formatting the data for an API response, loading this response on the user's device and presenting the result as the interactive overlay. It is a combination of front-end and back-end code. Loading the data and response occurs remotely on servers (5 a-d), and the presentation occurs on the user's device (6 a-b). With the matching content result from the previous phase, all relevant data is loaded from various tables which store KERVdata about the scenes and objects within the identified video. Then this data is formatted for API response purposes and sent back to the user's device. Upon receipt, the user's device renders the interactive interface, visualizing the scenes by thumbnail image. When scenes are launched, a larger version of the scene keyframe image is loaded, along with any associated object polygons. The polygons are interactive, and animated, allowing the user to interact with each object and view the associated title, description and URL associated with it. Steps 5 a-d and 6 a-b are labeled in the code with code comments, and are defined as the following:

5a. Get data from the matching video
5b. Get data from associated scenes of the video
5c. Get data from objects associated with the video's scenes
5d. Format data to send to client
6a. Render module
6b. Load and render data on client server Here are the associated algorithmic descriptions and representations used by those skilled in the data processing arts representing critical lines of code that demonstrate the new and unique aspects of ISM's use of prior art:

```
function handleReturn(response):
  // steps 5-6 triggered here...
  //5a
  creative = query(SELECT * FROM creatives WHERE id = AUDIO_STREAM.content_id)
  // 5b
  scenes = query(SELECT * FROM scenes WHERE creative_id = AUDIO_STREAM.content_id)
  //5c
  objects = query(SELECT * FROM objects WHERE scene_id IN map(scenes, id))
  // 5d
  // example response with core data - production data not limited to this format
  response = {
    id: creative.id,
    title: creative.title,
    accent_color: creative.accent_color,
    active_scene: creative.getSceneByFrame(AUDIO_STREAM.frame_number),
    scenes: [
      {
        id: scene.id,
        thumbnail: scene.thumbnail,
        background: scene.background,
```

```
        objects: [
          {
            id: object.id,
            polygon: object.polygon,
            title: object.title,
            description: object.description,
            url: object.url
          }...
        ]
      }...
    ]
  }
// 6a
function renderCarousel(response)
  for scene in response.scenes:
    thumb = drawImage(scene.thumbnail, CAROUSEL.width)
    thumb.outline - response.accent_color
    thumb.onTap(renderScene(scene))
renderCarousel(response)
// 6b
function renderScene(scene):
  drawImage(scene.background, SCREEN.width, SCREEN.height)
  for object in scene.objects:
    polygon = drawPolygon(object.polygon)
    polygon.data = object
    polygon.onTap(renderPolygon(polygon))
function renderPolygon(selected_polygon):
  for polygons as polygon:
    polygon.hide( )
  selected_polygon.animate(opacity, 1)
  drawPopup(selected_polygon.title, selected_polygon.description, selected_polygon.url)
renderScene(response.active_scene)
```

KERVdata object identifiers enable presentation technology to provide several creative-level interface customizations that keep content looking on-brand, allows for additional optimization opportunities, and adds substantial visual appeal to the viewer's experience well beyond standard connected content options. Examples of such presentation technology enabled by KERVdata are as follows.

Object-Glow Fill

As users engage, individual objects glow around their pixel-edges (defined by vertices) to indicate interactivity as given in an example described above. The specific color of global object glows for each video can be customized as well as cadence of object glows within a single scene.

Pixel-Edge Object Glow

The default pixel-edge outline and glow of objects identified by KERVdata object identifiers.

Custom Shape Object Glow (Editing Tool Driven)

Figure 7:
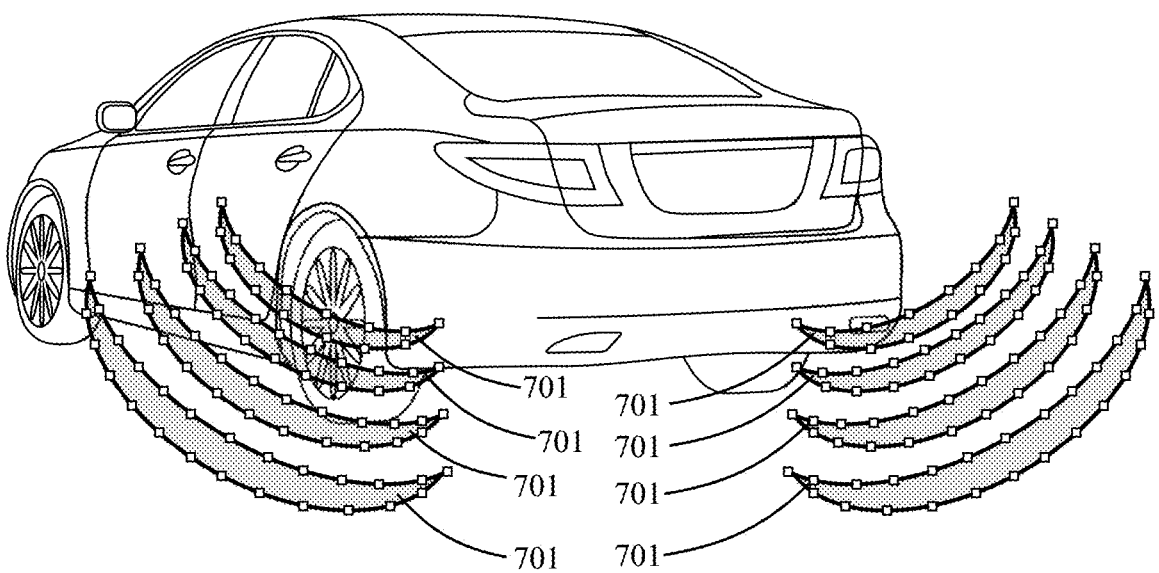
FIG. 7 is an illustration to show an example of using KERVdata objects to represent features that are not visible in video frame images.

In addition to pixel-edge identification, KERVdata can provide custom object glow shapes to highlight brand or product concepts outside of visuals presented in a frame. Example: As shown in FIG. 7, a driver's blind spot sonar lines (701) are highlighted to show an example of using KERVdata objects to represent features that are not visible in video frame images. In this case, the KERVdata polygons were manually drawn to represent the field of sonar waves used by the car to detect nearby objects.

Object Highlight Text

The KERVdata object identifier interactive overlay allows video content publishers to designate a unique title, description, call-to-action and clickthrough URL for each KERVdata object identified object within any frame Object Level HTML Options The KERVdata interactive overlay allows video content publishers to choose from a series of options in combination with or in the place of the Object Highlight Text. A few of these options include but are not limited to linking the KERVdata object identifiers with an embed link such as a YouTube® link, an image, a form or shopping cart integration.

IV. User Initiated Engagements (Data Analysis)

The following user engagements use titles and acronyms commonly used by those skilled in the data processing arts. The application of precise pixel thresholds defined by vertices produce the interactive content for user engagements.

Here are examples of some of the interactive terms of KERVdata using vertices:

Frame Select (FS)

The FS action occurs when a user clicks or taps a saved scene/frame for further interaction. The FS begins the time spent with frame calculation via a timestamp when the FS is launched. When a FS is launched, interactive elements glow and further interaction can occur. The FS (graphic) can also be used as an inclusion segment and has proven to be higher value than the Screen Save (SSV) but lower volume, as the scene or frame would have already been saved for the FS to occur. Pixels can be placed at this KERVdata point. The relationship between the FS and SSV could be analyzed to attribute value and interest in scenes as well as the relationship between the FS and the Object level data elements such as the OH. Algorithmic description and representations used by those skilled in the data processing arts:

```
on CAROUSEL_FRAME touch:
  log_event('FS')
  launch_overlay(CAROUSEL_FRAME)
end procedure
```

Object View (OV)

When the FS launches the overlay mode, all objects that have been KERVdata interactive defined will fire the OV data element. This data element allows streamlined analysis of object level relationships. For example, the OV versus Object Link (OL) relationship could be an indicator of the object's value to the scene as well as the relationship between the OV and the Object Highlight (OH). The Object View metric is not captured in the same way as the other metrics, and is calculated based on combining the FS metric with the objects in that scene.

Object Highlight (OH)

A glow feature occurs when users hover, select or tap an object in a FSed scene. The OH metric is tracked when the user hovers or selects an object in the scene, only counting if the selection lasts for at least 500 milliseconds. The timing qualifier ensures that the user is reading the description and confirms the interaction was deliberate. In addition to the data tracking, a glow effect is applied to the object so the user can clearly see what they are selecting. The glow color can be configured to be any hex code driven color. OH data elements (graphic) can be organized by frame or within the full asset for deeper interest level analysis. The OH fires the Object Time Spent (OTS) data element via a timestamp at the capture of the data element. The higher the time spent with an object, via the OH, the more the object is determined to be of higher value to the consumer. The relationship between the OH and the OL is one of the highest value relationships as it is deep into the scene, at the object level. Algorithmic description and representations used by those skilled in the data processing arts:

```
on OBJECT select:
    start timer (250ms):
        if OBJECT selected:
            log_event('object select')
        end if
    end timer
end procedure
```

Object Link (OL)

The OL is tracked when users touch to link out to an individual object in a scene. This action would direct a user to the specified URL. There must be an OH to then move into the OL data element. Pixels can be placed at this KERVdata point. Algorithmic description and representations used by those skilled in the data processing arts:

```
on OBJECT touch:
    log_event('object link')
    launch_url(OBJECT.url)
end procedure
```

Object Time Spent (OTS)

The OTS is a metric based on how long the user is spending with an individual object via the OH. It is a calculated metric based on the difference between when the object was highlighted and when the same object was deselected. The deselecting event is tracked and is represented by the Algorithmic description and representations used by those skilled in the data processing arts:

```
on OBJECT deselect:
    og_event('object deselect')
end procedure
```

SWIPE (Mobile and Tablet Only)

The swipe event occurs on mobile when the user shifts between the basic description of the object to the other options such as shop later or social share. Pixels can be placed at this KERVdata point. Algorithmic description and representations used by those skilled in the data processing arts:

```
on POPUP swipe:
    log_event('swipe')
    POPUP.transition(SWIPE.direction)
end procedure
```

SHARE (Mobile and Tablet Only)

The share event occurs when a user clicks on a social media icon or share icon to share an individual object within a scene. Pixels can be placed at this KERVdata point. Algorithmic description and representations used by those skilled in the data processing arts:

```
on SHARE_BUTTON touch:
    log_event('share')
    SHARE_BUTTON.launch_share_platform( )
end procedure
```

Here are examples of some of the interactive terms obvious to the person who is skilled in the art of data processing that does not use KERVdata™ vertices:

Scene Save (SSV)

The SSV data element is collected when a user taps or clicks on a scene of any connected content while the video is playing, saving that scene for further interaction. The SSV action is the first metric in the KERVdata based interactive overlay interaction funnel and is therefore typically one of the highest volume action-based data elements captured. The interaction funnel exists because of the dependency on certain interactions for others to occur. For example, if a primary scene action such as the SSV or FS does not occur, then it is not possible to get to the OH or OL. OH or OL which are lower in the interaction funnel and are typically lower volume due to the aforementioned dependencies defining the funnel, but higher value because of the additional user initiated actions required to capture the data. The SSV can provide interest data if the volume of SSVs is high within certain scenes and not others. Also comparing the volume of SSVs to time spent by scene of an asset would also assist in the analysis of valuing scenes throughout the entire connected interactive experience. Many data sets will exhibit much larger organic SSV data on higher value scenes than others. This analysis could result in changing the AP settings for everyone (although SSVs are not possible on Auto Populated Scenes), sequentially, or dynamically as the asset continues to run. If there are resources to change the asset and not just the KERV based interactive overlay configurations, the SSV along with other KERVdata delivery metrics could be used to decision on re-editing the video based on the most clicked and engaged-with scenes. Example of this data element's use: When distributing a piece of KERVdata connected content or trading via programmatic in-stream or optimizing on-site placement, the SSV metric is often used as an inclusion segment for retargeting purposes or could be the base data/seed data for a lookalike segment. Inclusion means that the users who have interacted are organized into segments that will be targeted again in the future. Inclusion segments can then be paired with other KERVdata delivery metrics and/or used to sequentially drive users down an attribution funnel within the KERVdata based interactive overlay or through an external process to purchase products they discovered within the video. Pixels can be placed at this KERVdata point. The relationship between the SSV and Impression could be analyzed for a ratio or rate as well as the relationship between the SSV and the FS. Algorithmic description and representations used by those skilled in the data processing arts:

```
on VIDEO touch:
    log_event('SSV') expand_carousel( )
    add_scene_to_carousel(VIDEO.currentframe)
end procedure
```

Frame Time Spent (FTS)

FTS is the time a user spends interacting with a unique frame while conducting deeper interactions such as the OH, Object link, share, or swipe. The FS must be conducted in order for this time relationship to exist. Algorithmic description and representations used by those skilled in the data processing arts:

```
on CAROUSEL_FRAME touch:
    log_event('FS')
    launch_overlay(CAROUSEL_FRAME)
end procedure
```

In the reporting pipeline, the FTS metric is calculated like this:

frame_time_spent=frame_close.timestamp−frame_select.timestamp

Brand Logo Click (BLC)

The BLC is an interactive option within the overlay. It typically is a logo of the content provider's brand and links out to their main webpage for more information. Pixels can be placed at this KERVdata point. Algorithmic description and representations used by those skilled in the data processing arts:

```
on BRAND_LOGO touch:
    log_event('OTS')
    launch_url(BRAND_LOGO.url)
end procedure
```

Carousel Open (CO)

The CO event is captured when a user expands the carousel for further scene interaction. The CO is organized as an activity but not an interaction. Pixels can be placed at this KERVdata point. Algorithmic description and representations used by those skilled in the data processing arts:

```
on CAROUSEL_HANDLE touch:
    log_event('CT')
    if CAROUSEL.is expanded:
        log_event('CC')
        CAROUSEL.collapse( )
    else:
        log_event('CO')
        CAROUSEL.expand( )
    end if
end procedure
```

Carousel Close (CC)

The CC event is captured when a user closes an already opened carousel. This option is given to the user so they can control the carousel, as it obstructs part of the content video when expanded. The CC is organized as an activity but not an interaction. Users who conduct a high volume of CCs and no other interactions could be analyzed as not interested and thus excluded from any additional view. Pixels can be placed at this KERVdata point. Algorithmic description and representations used by those skilled in the data processing arts:

```
on CAROUSEL_HANDLE touch:
    log_event('CT')
    if CAROUSEL.is expanded:
        log_event('CC')
        CAROUSEL.collapse( )
    else:
        log_event('CO')
        CAROUSEL.expand( )
    end if
end procedure
```

Carousel Scroll (CS)

The CS event occurs when a user scrolls through the list of scenes in the carousel. This event is only relevant when the number scenes in the carousel exceed the available height of the video display. Pixels can be placed at this KERVdata point. Algorithmic description and representations used by those skilled in the data processing arts:

```
on CS(scroll_direction):
    log_event('CS')
    CAROUSEL.scroll_scenes(scroll_direction)
end procedure
```

Scene Close (SC)

```
Logged when a user closes the scene and the video continues to play.
on SCENE_CLOSE_BUTTON touch:
    log_event('SC')
    close_scene(active_scene)
    video.play( )
end procedure
```

Primary Call to Action (PCTA)

An optional and customizable button that can link to a unique URL. The button usually contains a call to action such as "Shop Now". The unique configurations are color and text based. Pixels can be placed at this KERVdata point. Algorithmic description and representations used by those skilled in the data processing arts:

```
on PCTA_BUTTON touch:
    log_event('PCTA')
    launch_url(PCTA_BUTTON.url)
end procedure
```

Here are examples of Interactive formulas using KERVdata vertices to enable the use of metrics and their calculations Total Interactions Total Interactions are defined as the sum of all user interaction metrics with branded elements of the experience, including SSV, FS, OH, Share, OL, BLC and PCTA. These are all activities minus the carousel activities and swipes. These interactions are brand engagements versus simply playing with the functionality of our Kerv technology. Pixels can be placed at all included KERVdata elements. Algorithmic description and representations used by those skilled in the data processing arts:

Total Interactions=$SSV+FS+OH+OL+PCTA+BLC+$ Share

Total Interaction Rate=Total Interactions/Total Impressions

Note: The total interaction rate can be formatted as a percentage by multiplying by 100.

Total Activity

All user interactions including SSV, FS, OH, swipe, share, OL, BLC, PCTA button, and the carousel activity. Pixels can be placed at all included KERVdata points. Generally, total Activity includes all touches, engagements, and interaction elements within the player with the exception of Scene Close. Algorithmic description and representations used by those skilled in the data processing arts:

Total Activities=Total Interactions+$CO+CC+CS+$ Swipe

Total Activity Rate=Total Activities/Total Impressions

Note: The total activity rate can be formatted as a percentage by multiplying by 100

User Journey

Together, the above KERVdata based delivery metrics, track the unique path each individual user takes through the KERVdata based Interactive Overlay. This results in a precise definition of user preferences based on real user activities. For example, user 1 may start with a SSV, then a FS, then an OH and then go into an OL. User 2 may complete a double click FS and then go directly to a BLC. This outline allows for the original KERVdata based Interactive Overlay and KERVdata delivery metrics to be analyzed and modeled to tell user specific stories hinged in data. This also allows for unique optimization opportunities (via the distribution and/or within the overlay configuration) including blocking users who action in a certain manner, retargeting users who complete a certain set of interactions, sequential and/or dynamic setups based on previous user behaviors or interactive frequency. For instance, the KERVdata allows for retargeting similar content based on the interactions the user executes with a specific object or set of objects. This KERVdata collection provides insight into the unique user journey; with visibility to a multitude of metrics to understand how interactive connected video content (ICVC) is performing. Due to the large volume of data captured, the KERVdata delivery metrics are summarized and reviewed from a holistic standpoint to provide measurable user metrics and outcomes.

Sequential outline means that based on the data, the original KERVdata asset could be optimized sequentially based on previous user behaviors, based on frequency. For example, frequency 1 delivers and the user only gets through ⅓ of the video and only interacts with the first 2 scenes. Using the KERVdata delivery metrics, the user (frequency 2) is retargeted with the same asset but the roll over text is changed to say something different for any of the objects that were already interacted with (within frequency 1), within the first 2 scenes, and then the 3 or 4th scene could be Auto Populated (AP) to incentivize interaction further into the video.

Definitions of Terms

Carousel

The mechanism that holds the AP or SSd scenes. The carousel can be opened, closed or scrolled within. The Carousel open and close can be done via what is known as a Hamburger icon, which is a box with 3 parallel lines at the mid-top of the experience.

Funnel

Defined as requiring interactions to get to others, whether it is within the KERVdata hierarchy or marketing world. The funnel is defining a user's Journey which is sometimes defined as Awareness—a consumer becoming aware of the product, service, etc., Consideration—a consumer wanting to learn more about the product, and Conversion—the final purchase of the product or final desired action is complete. Just like this marketing funnel, KERVdata delivery metrics have a funnel that starts with the impression and interactions that are launched at the start of the experience and flows down with the interactions that have to be unpacked with others. Each unique interaction presented by the overlay experience could have a completely unique path through the funnel of the interactive experience, by saving certain scenes, freezing certain frames, highlighting a unique set of objects and finally, clicking out to a unique set of pages, all of which, they have driven, throughout the KERVdata interactive experience.

Auto-Populate

The KERVdata based interactive overlay consumer experience offers the ability to override certain manual actions such as the Scene Save by selecting high value frames to be Auto-Populated versus requiring the manual selection. In this configuration, scenes can be proactively configured within the KERVdata interactive overlay setup process to automatically populate into the carousel. This removes the SSV interaction option for these scenes and takes the user down the interaction funnel to a Frame Select (FS) option. This is a creative option as well as an optimization option and can be avoided altogether.

Targeting

Targeting is a pro-active distribution setup to specific groups of users who are defined through their online behaviors. Online advertising and technologies allow for groups of users to be defined with certain attributes such as demographic, geographic, or interest-based qualities. Targeting can be used in conjunction with the KERVdata interactive experience to further slice interactive behavior patterns using the unique analytic lens that KERVdata provides.

Retargeting

Proactive setup to only show ICVC to specific groups of users with the KERVdata based interactive overlay that completed certain actions such as the FS through a previous interactive experience with the KERVdata based interactive overlay. Groups of users are organized by their completion of certain actions and re-served the KERVdata based interactive overlay experience. For example, if a user completes several high-level interactions throughout the experience but does not click out to purchase, this group of users can be organized into a group and then re-served with the same or an optimized KERVdata based interactive overlay experience. This would be one example of retargeting. KERVdata's unique delivery metrics/analytics, down to the object level, provide a unique retargeting experience, specifically when referencing back to the unique touch pattern data that KERVdata allows.

Sequential Targeting

Sequential targeting means that based on the data, the original KERVdata based interactive overlay could be optimized sequentially based on previous user behaviors based on frequency. For example, frequency 1 delivers and the user only gets through ⅓ of the video and only interacts with the first 2 scenes. Using this KERVdata, the user is retargeted with the same asset but change the roll over text to say something different for any of the objects that were interacted with (frequency 2), within the first 2 scenes, and then the 3 or 4th scene could be AP to incentivize interaction further into the video.

Overlay Creative Configuration

Collection of options regarding text, messaging, color, exclusion and inclusion of features which render within the interactive overlay. These options are modular and can be changed based on distribution, performance, targeting, product availability, etc.

Non-User Initiated Events

Here are examples of configuration and interactive terms using both KERVdata vertices and terms obvious to a person who is skilled in the art of data processing. The application of precise pixel thresholds defined by vertices makes the content of the user engagements unique and novel and non-obvious to a person skilled in the data processing arts.

Auto-Populated (AP)

AP is the only activity within the player that is not user initiated and is a player configuration (unlike quartiles). The action of Auto-Populating scenes into the carousel is a creative configuration that automatically places scenes into the carousel as they play, without the user needing the SS them, allowing them explore the scene at a later time. Any scene that is Auto Populated cannot have the Scene Select action occur in the data so the first available action would be the FS. Algorithmic description and representations used by those skilled in the data processing arts:

```
on VIDEO_ENTER_FRAME(frame_number):
    if frame_number IN autopopulate_scene_frames:
        log_event('AP')
        expand_carousel( )
        add_scene_to_carousel(frame_number)
    end if
end procedure
```

Timestamps (TS)

A timestamp for every metric tracked is recorded. The TS are used to aggregate events in reporting based on month/day/hour, as well as to measure the time between events, such as the example above with the FTS metric. The TS metrics are all captured in milliseconds. The scene numbers and time stamps are collected but these are not added into the interaction or activity data.

The calculation using the two metrics is:
ObjectDeselectEvent.timestamp—ObjectSelectEvent.timestamp+250

KervData Optimizations

Here are examples of configuration and interactive terms using both KERVdata vertices and terms generally known to a person who is skilled in the art of data processing. The application of precise pixel thresholds defined by vertices makes the content of the user engagements unique.

Video Scene Optimizations (VSO)

Use case 1:
  Users who saved scenes or launched scenes but never interacted with objects are retargeted (and can be served a different configuration of the KERVdata based interactive overlay). This pool of users includes those who tracked SS and/or FS events, but no OH or Link events.

Use Case 2:
  Users who are spending time with certain scenes and not others can be retargeted in a unique way, based on this data. The text within the OH can be sequentially updated to get them down the funnel and make the experience unique.

Use Case 3:
  AP strategy can be optimized based on this data as well as the creative production.

Video Object Optimizations (VOO)

Users who interacted with KERVdata identified objects but did not conduct KERVdata driven object links within the interactive experience are retargeted to complete the process. Users that engaged in OHs, but not OLs define this pool of users. These optimizations include but are not limited to the ability to optimize on the engagement, frame, and interaction behaviors with any object in any video and can also be optimized based on scene level interactions. Users can be organized by the relationships between the OV, OH, and OL and can feed optimizing what object should glow, what the messaging should say as well as the sequence of the glow and glow color (glow graphics 2).

Video Engagement Optimizations (VEO)

Users can be bucketed into their different paths and retargeted with unique experiences. For example, users who interacted but did not link out within the 3+ opportunities presented to them can be retargeted. Users who engage in a unique way can be bucketed into intention groups and retargeted uniquely. Retargeting can be done with the same asset or optimization modifications can be made to the applicant's technology to couple with the engagement side optimization. The KERVdata technology offers many unique ways to complete these optimizations given the multiple creative options such as AP, color of button, size of logo, call to action within the PCTA button, glow color, OH text, sequence of the glow, and many more. There are also the multiple data elements that can be organized and uniquely used within the distribution and targeting side.

Demand Side Optimization Platform (DSOP) Embodiment

The KERVdata DSOP utilization embodiment provides unique KERVdata based metric and object level algorithms, that can only be quantified because KERVdata technology generates and defines greater viewer actions and interaction opportunities than existing prior art tagging methods, including hotspots using bounding boxes or pre-defined geometric shapes that do not allow pixel precise object recognition. KERVdata creates specific precise outlines defined by vertices around objects based on the threshold clusters that surround certain clusters of pixels that are representative of a specific object allowing greater precision. The KERVdata environment is an eco-system built exclusively for the distribution, user analytical data optimization, and performance of KERVdata based Interactive Overlay. The KERVdata environment utilizes unlimited data-driven models against interactive metrics defined herein to create extraordinary optimization using KERVdata objects.

The customized KERVdata may be be redistributed to be further optimized based KERVdata object level insights. Domain, user, SSP, along with other revisions can be made, inclusive of creative modifications as well. The KERVdata environment allows the user to engage; hover, click or tap on any KERVdata object found in any connected KERVdata interactive content representing any person, place or thing in a frame of video.

The KERVdata environment is a unique video player agnostic distribution technology where videos can be viewed and interacted with on any websites, mobile sites and mobile apps with the push of a button, touch of a finger or click of a mouse.

We claim:

1. A method for associating a product presented in a video stream with object information for use by an end user comprising:

capturing an audio sample of audio being played associated with said video stream;

extracting an audio fingerprint from said captured audio sample;

passing said audio fingerprint to an audio fingerprint database;

receiving a match from said audio fingerprint database;

sending said match to a video metadata database;

receiving from said video metadata database as a result of said sending an interactive video overlay including object identifiers corresponding to products being displayed by said video stream;

presenting to said end user, said interactive video overlay including said object identifiers corresponding to at least one product being displayed by said video stream, said product appearing in video frames which have audio which matches said captured audio sample, wherein said object identifiers define an overlay identifying the product, said overlay having vertices defining a pixel edge boundary, said overlay forming a contextual bounding box associated with said overlay;

presenting an interactive interface corresponding to said object identifiers;

enabling said end user to interact with said presented interaction patterns to select said at least one product in said video stream;

after said selecting, presenting said end user with information for further action to be taken by said end user.

2. The method defined by claim 1 wherein said interactive video overlay includes a selectable object feature.

3. The method defined by claim 2 where said selectable object feature is a glow which identifies said at least one selected product.

4. The method defined by claim 1 wherein said enabling includes providing an embedded hyperlink to a product page which provides additional product information.

5. The method defined by claim 1 wherein said enabling includes providing an embedded hyperlink to a product page from which the end user can initiate a purchase of the at least one product.

6. The method defined by claim 1 wherein said object identifier indicates interactivity by providing a glow around pixel edges of an object corresponding to a selected product.

7. The method defined by claim 1 wherein said object identifier indicates interactivity by providing a title and URL for an object corresponding to a selected product.

* * * * *